(12) United States Patent
Austin et al.

(10) Patent No.: US 7,114,462 B2
(45) Date of Patent: Oct. 3, 2006

(54) AUTOMATED CAGE CLEANING APPARATUS AND METHOD

(75) Inventors: Daryl Austin, Newfane, NY (US); Edward J. Horeth, Rochester, NY (US); Darryl Dinel, Atlanta, GA (US); Ronald Potter, Dunwoody, GA (US)

(73) Assignee: Matrix Scientific, LLC, Newfane, NY (US)

( * ) Notice: Subject to any disclaimer, the term of this patent is extended or adjusted under 35 U.S.C. 154(b) by 0 days.

(21) Appl. No.: 10/755,248

(22) Filed: Jan. 12, 2004

(65) Prior Publication Data

US 2005/0166860 A1    Aug. 4, 2005

(51) Int. Cl.
*A01K 1/01*    (2006.01)
(52) U.S. Cl. .................................... 119/458
(58) Field of Classification Search ............. 119/439, 119/442, 443, 455, 458, 457, 476, 479, 6.8; 134/122 R, 64 R, 123, 131
See application file for complete search history.

(56) References Cited

U.S. PATENT DOCUMENTS

| | | | |
|---|---|---|---|
| 5,439,015 A * | 8/1995 | Shibano .................... | 134/66 |
| 5,759,289 A | 6/1998 | Caron et al. | |
| 5,771,840 A | 6/1998 | Pelletier | |
| 5,967,160 A | 10/1999 | Rochette et al. | |
| 6,129,099 A * | 10/2000 | Foster et al. ............... | 134/57 R |
| 6,257,254 B1 | 7/2001 | Rochette et al. | |
| 6,394,033 B1 | 5/2002 | Trogstam et al. | |
| 6,439,248 B1 | 8/2002 | Rochette et al. | |
| 6,553,939 B1 | 4/2003 | Austin et al. | |
| 6,634,507 B1 * | 10/2003 | Høst-Madsen et al. ..... | 209/702 |
| 6,811,164 B1 * | 11/2004 | Trogstam .................... | 280/79.3 |

OTHER PUBLICATIONS

Two page advertisement for visTRAC system by Fanuc Robotics America, Rochester Hills, MI 48309-3253, copyright 2003.
Selected Slides of a Presentation to the Memorial-Sloan Kettering Cancer Center on Sept. 22, 2002.

* cited by examiner

*Primary Examiner*—T. Nguyen
(74) *Attorney, Agent, or Firm*—Jaeckle Fleischmann & Mugel, LLP

(57) ABSTRACT

The automated cage cleaning system is comprised of a pair of robotic arms, a soil side robot and a clean side robot. The soil side robot is utilized for removing the dirty cage bottoms from a cart, rack, pallet, or fixture, emptying soiled bedding from the cage bottoms, and placing the cage bottoms on a conveyer leading to the tunnel washing equipment. The clean side robot is used to grip the clean cage bottoms, and place the cage bottoms on a cart, rack, pallet, or fixture. Additionally, the present invention comprises an optical arranger robot with vision processing for detecting, and moving skewed cage bottoms to a re-grip station. From the re-grip station, the clean side robot places the cage bottoms on a rack, pallet, fixture, or any other device suitable for holding a plurality of cage bottoms.

20 Claims, 4 Drawing Sheets

AUTOMATED CAGE CLEANING APPARATUS AND METHOD

TECHNICAL FIELD

The present invention relates to an improved apparatus and method for cleaning the cages of laboratory animals.

BACKGROUND OF THE INVENTION

A conventional cage system for holding small laboratory animals is typically a three piece assembly having a clear plastic bottom, a grill for holding food and water, and a lid that attaches to the bottom and holds the grill in place. Additionally, a suitable bedding material, such as cedar shavings, is added to the bottom portion of the cage assembly to absorb animal waste and spilled food.

While in use the bedding becomes soiled, thereby necessitating the need for frequent cleaning of the cages. The cleaning process requires disassembly of the cage, removal of the soiled bedding from the bottom portion, washing, and drying the cage elements. Furthermore, upon completion of the aforementioned steps, clean bedding is added to the cage.

Robotic arms are known to assist laboratory personnel with this process. Currently, after the cages are disassembled, robotic arms remove the soiled cage bottoms from a cart, invert the cage bottoms to thereby empty the contents (soiled bedding material), and place the empty/soiled cage bottoms in an appropriate position on a conveyer. The conveyer then advances the cage bottoms through a chamber or tunnel wash system, wherein the cage bottoms are cleaned by a suitable process, usually involving high pressure streaming water. Furthermore, a drying process is typically accomplished by subjecting the cleaned, yet wet cage bottoms to high velocity heated air. The other cage components, such as the grill and lid, may be cleaned in a similar manner.

Upon completion of the cleaning process, an automated device, such as an additional robotic arm, removes the cage bottoms from the conveyer and adds clean bedding. The cages are then reassembled and stacked on a cart where they may be returned to service.

Due to the extreme force of the streaming water required to clean the cage bottoms, the high velocity air required for drying, and the transfer of components between conveyers, the cage bottoms become skewed on the conveyer. The unpredictable arrangement of the skewed cage bottoms complicates automated removal of the cage bottoms from the conveyer. Robotic arms currently require the cage bottoms to be in a specific predetermined location. Because of the turbulent conditions of the process described above, the robotic arm can not efficiently remove the cage bottoms from the conveyer.

Additionally, robotic arms currently used in cage cleaning systems have bases that are fixedly mounted to the ground. Generally, the base of a first robotic arm is fixedly mounted to the ground in an area designated for receiving the soiled cage components, and the base of a second robotic arm is fixedly mounted to the ground in an area designated for removing and assembling cages that have proceeded through the cleaning process. Because the base of the robotic arm is fixedly mounted to the ground, the area serviced by the robotic arm is limited to the area about the base. Furthermore, this configuration strictly limits the positioning of equipment accessed by the robotic arm, and thereby limits options in designing cage cleaning facilities.

Therefore, what is needed in the art is a cage cleaning apparatus and method that serves to reduce the repetitive steps associated with loading and unloading cage components on tunnel type cage washing systems.

Furthermore, what is needed in the art is an apparatus and method for cleaning cages that serves to limit human exposure to potentially harmful substances.

Moreover, what is needed in the art is an apparatus and method of cleaning cages that addresses the problems associated with the handling of skewed cage bottoms exiting the tunnel wash system.

Even further, what is needed in the art is an apparatus and method for cleaning cage components that utilizes a robotic arm that is more versatile and can service a greater area.

SUMMARY OF THE INVENTION

In order to overcome the above stated problems, the present invention provides an automated cage cleaning apparatus and method that reduces repetitive steps and limits human exposure to potentially harmful substances. Furthermore, the cage cleaning system of the present invention provides an apparatus and method for detecting and removing skewed cage bottoms from a conveyer. Moreover, the present invention comprises at least one robotic arm having a rail mounted non-stationary base, capable of being mounted on a floor, wall, ceiling, or in a pit. This unique configuration allows more flexibility in the design of cage cleaning facilities and provides a means for a single robotic arm to handle multiple processes.

The automated cage cleaning system of the present invention provides a means for receiving soiled cage bottoms, loading and unloading the cage bottoms onto conveyers entering and exiting tunnel washing equipment, adding clean bedding to the cage bottoms, and returning the clean cage bottoms to service. The present invention further comprises a pair of robotic arms, such as a soil side robot and a clean side robot. The soil side robot is utilized for removing the dirty cage bottoms from a cart, rack, pallet or fixtured conveyer emptying soiled bedding from the cage bottoms, and placing the cage bottoms on a conveyer leading to the tunnel washing equipment. The clean side robot is used to grip the clean cage bottoms, and place the cage bottoms on a cart, rack, clean pallet, or fixtured conveyer.

Additionally, the present invention comprises an optical arranger robot with vision processing for detecting and moving skewed cage bottoms from either a conveyorized bedding dispenser or conveying table to a re-grip station. From the re-grip station, the clean side robot places the cage bottoms on a rack, pallet, fixture, or any other device suitable for holding a plurality of cage bottoms.

The soiled and clean side robots of the present invention further comprise bases that are slidably mounted on a rail. This configuration provides the robots with an additional axis of movement, allowing more versatility in designing cage cleaning facilities. The robots also comprise a vertical rail, substantially perpendicular to the base, and an arm segment extending outward, substantially perpendicular to said vertical rail. Attached to a distal end of the arm segment is a gripping means. The gripping means and arm segment are adapted to firmly grasp a plurality of cage bottoms, invert the cage bottoms, and move the cage bottoms to the next stage in the process.

BRIEF DESCRIPTION OF THE DRAWINGS

The above-mentioned and other features and advantages of this invention, and the manner of attaining them, will become appreciated and be more readily understood by reference to the following detailed description of one embodiment of the invention in conjunction with the accompanying drawings, wherein.

DESCRIPTION OF THE PREFERRED EMBODIMENT

Figure 1:
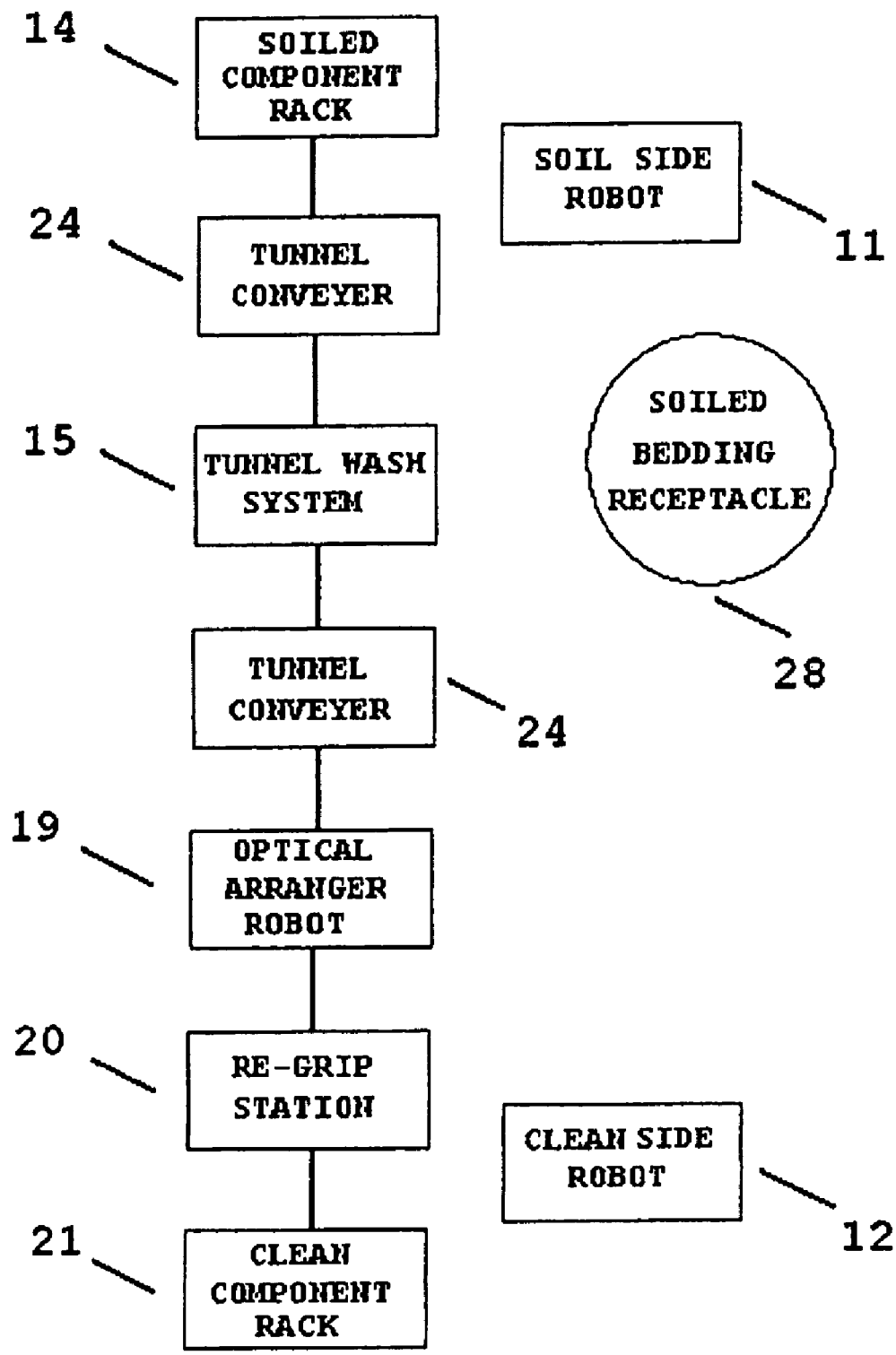
FIG. 1 is a flow diagram of the automated cage cleaning apparatus and method of the present invention.
Figure 2:
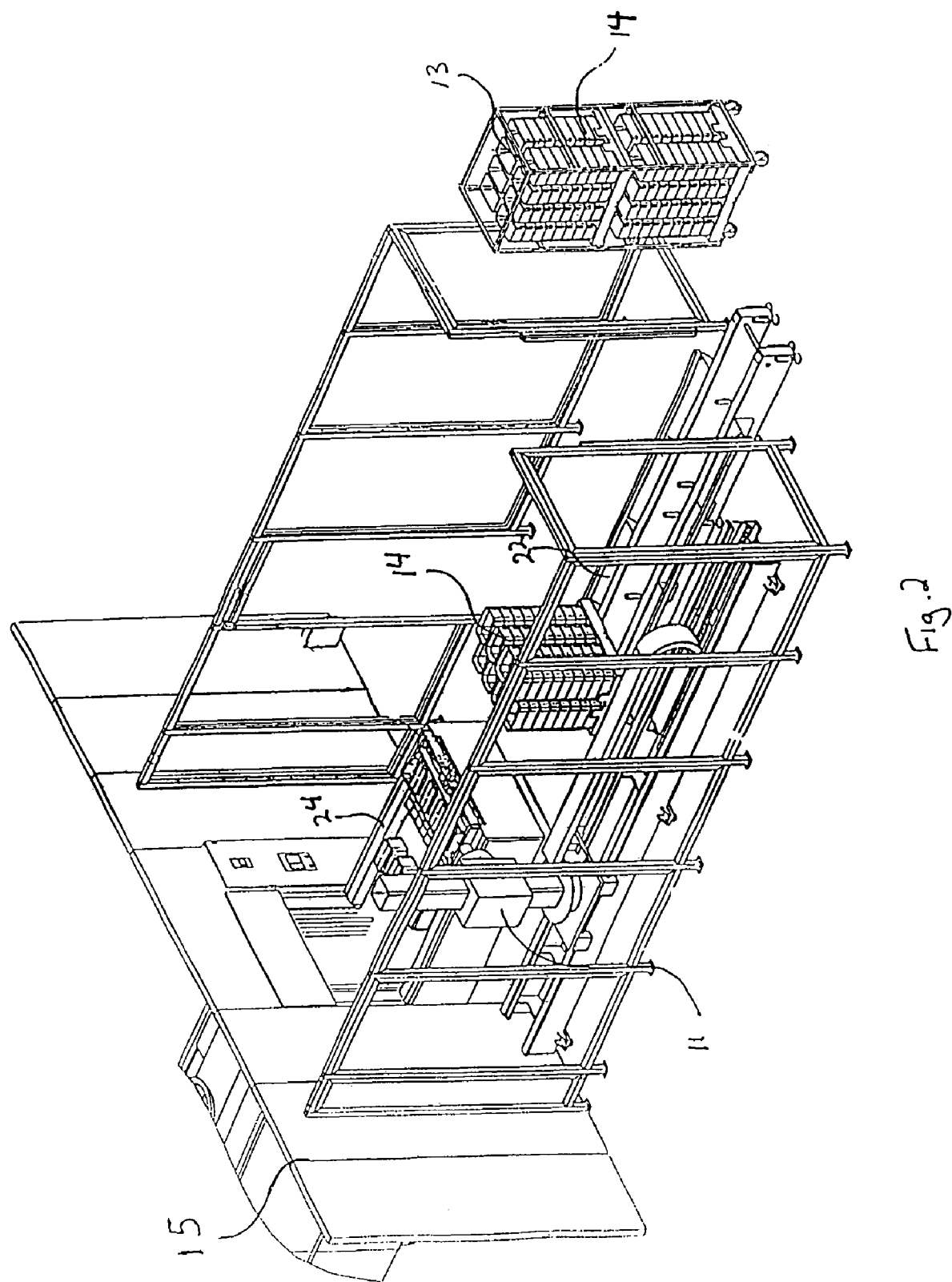
FIG. 2 is a perspective view of the soil side of the automated cage cleaning apparatus of the present invention.
Figure 3:
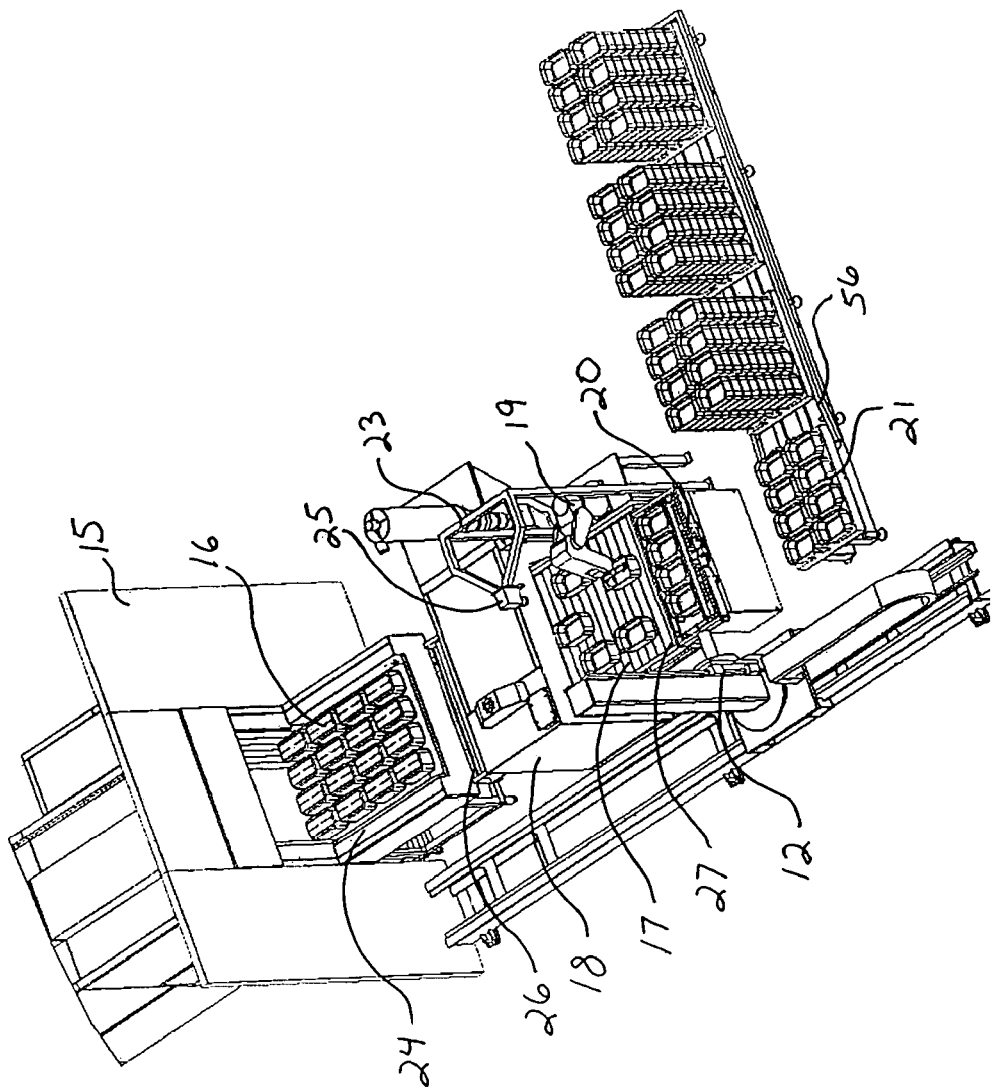
FIG. 3 is a perspective view of the clean side of the automated cage cleaning apparatus of the present invention.

Referring to FIGS. 1–3, a flow diagram and perspective views of the improved apparatus and method for cleaning animal cages are shown. The apparatus includes a pair of loading/unloading robots, referred to hereinafter as the soil side robot 11, and the clean side robot 12. Additionally, the apparatus further comprises optical arranger robot 19. In operation, the soiled cage components arrive at the cleaning area on a component cart 13, or any suitable device for transporting a plurality of soiled components. The cart further comprises at least one soiled component rack 14 holding soiled cage bottoms, wherein the rack of soiled cage bottoms is attachable to an in-feed conveyer 22. Once the rack 14 is securely attached upon the in-feed conveyer 22, it advances toward soil side robot 11. The soil side robot 11 grasps a plurality of cage bottoms from the rack 14, inverts the cage bottoms over a soiled bedding receptacle 28 (FIG. 1), or any device suitable for receiving the soiled bedding from the cage bottoms, and places the cage bottoms in an inverted fashion (open end facing down) on the tunnel washer conveyer 24 leading to the tunnel wash system 15, such as, for example, a continuous driven belt tunnel washer. Once an appropriate number of soiled cage bottoms are received into the tunnel washing system 15, the cage bottoms are washed and dried by an appropriate means. Upon completion of the wash/dry process, the clean cage bottoms 16 advance on the tunnel washer conveyer 24, toward the clean conveyorized bedding dispenser 18. Prior to reaching the conveyorized clean bedding dispenser 18, the cleaned cage bottoms 16 drop from the tunnel washer conveyer 24 to an inline conveyer 17. The inline conveyer 17 further comprises a receiving end 26 and a dispatch end 27. The drop from the tunnel washer conveyer 24 to the inline conveyer 17 causes the clean cage bottoms 16 to invert (open end facing up) upon the receiving end 26 of the inline conveyer 17. The reorientation of the clean cage bottoms 16 enables the cage bottoms 16 to receive clean bedding from the conveyorized clean bedding dispenser 18. While a particular embodiment of the present invention utilizes an inline tunnel type conveyorized bedding dispenser, any suitable bedding dispenser may be used.

The turbulent conditions of the tunnel washing process, as well as the reorientation of the cage bottoms onto the inline conveyer, cause the cage bottoms to become skewed or disoriented. The system further comprises an optical arranger robot system for detecting skewed or disoriented cage bottoms on the inline conveyer 17, and placing the cage bottoms in an orderly arrangement upon the cage bottom re-grip station 20. Additionally, the optical arranger robot system can detect and reorient various cage components, such as wire baskets used to transport water bottles, or serve to dispense bedding into cage bottoms.

In operation, as the cage bottoms with clean bedding progress toward the dispatch end 27 of the inline conveyer 17, they pass below an optical eye 25. The optical eye 25 is mounted on an elevated stationary structure 23 above the inline conveyer 17. The optical eye 25 is aptly positioned to view a predetermined area of the inline conveyer 17. While FIG. 3 shows an optical eye 25 mounted on an elevated stationary structure, additional embodiments are contemplated wherein the optical eye 25 may be mounted upon any suitable structure, such as, for example, the optical arranger robot 19. In operation, the optical eye 25 transmits a video signal, presenting the position of the skewed cage bottoms to an encoding device (not shown). The encoding device serves to convert the video signals received from the optical eye 25 into command signals suitable for guiding the optical arranger robot 19. The optical arranger robot 19 may be mounted adjacent to the dispatch end 27 of the inline conveyer 17 and the cage bottom re-grip station 20 as illustrated in FIG. 3, or in any suitable position. As skewed cage bottoms progress toward the optical arranger robot 19, the optical arranger robot 19 receives a command signal from the encoding device (not shown), providing the position of the cage bottoms, and enabling the optical arranger robot 19 to grasp the cage bottoms and place them on the cage bottom re-grip station 20. From the cage bottom re-grip station 20 the cage bottoms are lifted by the clean side robot 12, and stacked on an appropriate clean component rack 21 so that they may be returned to service. Alternatively, clean side robot 12 may transfer the cage bottoms from the re-grip station 20 directly to an out-feed conveyer 56.

Furthermore, while the description above describes the cleaning of cage bottoms, the apparatus and method of the present invention may be used for cleaning various other cage components, such as grills for holding food and water and cage lids.

Figure 4:
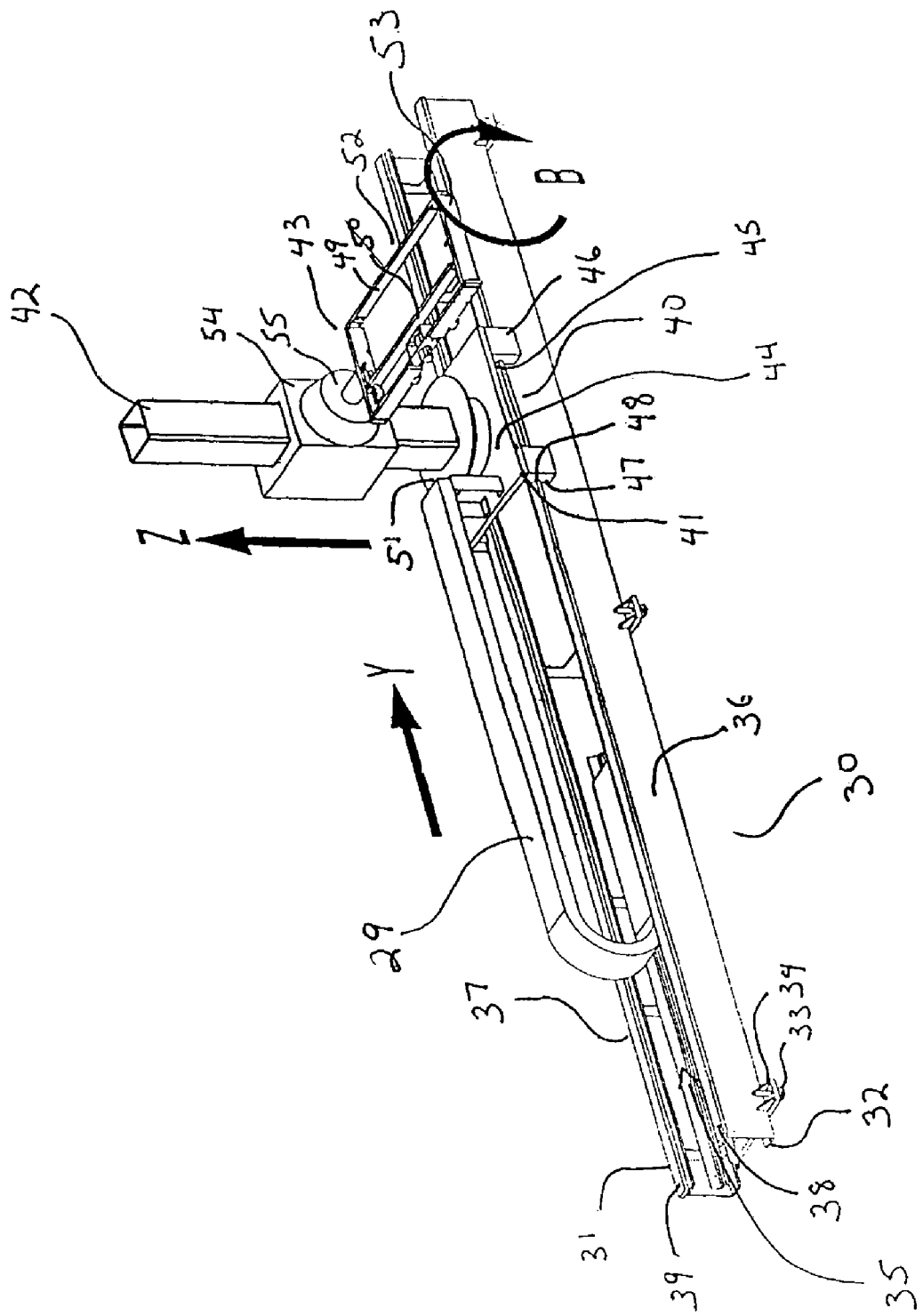
FIG. 4 is a perspective view of the soil/clean side robotic arm of the automated cage cleaning apparatus of the present invention.

Referring now to FIG. 4, a perspective view of the loading/unloading robot is shown. The robot comprises a stationary mounting section 30 having an upper side 31 and a lower side 32. The lower side 32 of the stationary mounting section 30 is generally in communication with the floor. The upper side 31 of the stationary mounting section 30 serves as a track to allow the arm assembly 40 to move along a horizontal axis (Y direction). The lower side 32 of the stationary mounting section 30 further comprises a plurality of leveling screw assemblies 34 and leveling screws 33, thereby providing a means of assuring the stationary mounting section 30 is in stable communication with the floor. While this particular embodiment illustrates the stationary mounting section 30 positioned for mounting to the floor, it is understood that the stationary mounting section 30 may be mounted to a wall, ceiling, or in a pit, if so desired. The upper side 31 of the stationary mounting section 30 comprises a track or a guideway 35. Additionally, the stationary mounting section 30 further comprises a first side wall 36 and a second side wall 37, each sidewall terminating at a respective upper guide 38 and 39. The upper guides 38 and 39 are substantially perpendicular to the sidewalls 36 and 37 respectively, and extend outward therefrom.

The arm assembly 40 comprises an assembly carriage plate 41, a vertical rail 42, and an arm section 43. The carriage plate 41 serves as the pedestal for the arm assembly 40, and is in slidable communication with the stationary mounting section 30. More particularly, the carriage plate 41 further comprises a carriage plate upper surface 44 and a carriage plate lower surface 45. The carriage plate lower surface 45 has a plurality of pillow blocks 46 extending downward therefrom. The pillow blocks 46 each comprise a pillow block inner wall 47 having a groove 48 and bearing (not shown). The grooves 48 are adapted to receive the upper guides 38 and 39, so that the carriage plate 41 is in slidable communication with the stationary mounting section 30. Furthermore, the carriage plate 41 comprises a means for receiving the pneumatic and power lines necessary to control the arm assembly 40. In the illustrated embodiment of the present invention a flexible cable tray 29 is used to provide the electronic and pneumatic connections needed to operate the arm assembly 40.

In operation, the carriage plate 41 is propelled along the base 30, in the Y direction, via a rack and pinion system (not shown). The rack runs the length of the track between the sidewalls 36 and 37, and below the carriage plate 41. The lower surface 45 of the carriage plate 41 further comprises a servo motor with a pinion (not shown), wherein said pinion engages said rack to thereby propel the carriage plate 41 along the stationary mounting section 30.

Furthermore, the carriage plate 41 further comprises a carriage plate turret assembly 51. Vertical rail 42 extends in the Z direction, wherein the vertical rail 42 is rotatable about said carriage plate 41. Additionally, vertical rail 42 serves to provide vertical lift for the arm section 43.

The arm section 43 comprises a vertical coupler 54, having a vertical coupler turret 55 attached thereto. Extending outward from said vertical coupler turret 55 is the grasping arm 52. The grasping arm 52 comprises a rectangular frame 53 having a pair of padded gripper clamping bars 49 and 50 and pneumatic cylinders (not shown) for opening and closing the padded gripper clamping bars 49 and 50. In operation, upon actuation of the pneumatic cylinders (not shown), a bank of cage bottoms or wire baskets are clamped between the padded gripper clamping bars 49 and 50. Additionally, when used in conjunction with the soil side robot 11, the vertical coupler turret 55 serves to rotate the grasping arm 52 (B direction), providing a means for removing soiled bedding from the cage, as well as reorientation of cages prior to placement on tunnel washer conveyer 24.

The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

We claim:

1. An apparatus for cleaning animal cage components comprising:
    a soil side robot having a robotic arm assembly for removing soiled bedding from at least one of said cage components, and placing said at least one of said cage components upon a tunnel conveyer for advancing said at least one of said cage components through a tunnel washing system;
    an optical arranger robot system for detecting said at least one of said cage components exiting said tunnel washing system, and placing said at least one of said cage components upon a re-grip station;
    a clean side robot for removing said at least one of said cage components from said re-grip station, and placing said at least one of said cage components on a rack, pallet, or fixture; and
    said soil side robot has a robotic arm assembly having a base slidably mounted and attached to a substantially horizontal track on a stationary mounting section.

2. The apparatus for cleaning animal cage components of claim 1, wherein said tunnel washing system is a continuous driven conveying belt tunnel wash system.

3. The apparatus for cleaning animal cage components of claim 1, further comprising a clean bedding dispenser for adding bedding material to said at least one of said cage components that have passed through said tunnel washing system.

4. The apparatus for cleaning animal cage components of claim 1, further comprising an inline bedding conveyer wherein said inline bedding conveyer is located adjacent to said tunnel conveyer and said optical arranger robot system.

5. The apparatus for cleaning animal cage components of claim 4, wherein said inline bedding conveyer further comprises an inline tunnel type conveyorized bedding dispenser.

6. The apparatus for cleaning animal cage components of claim 4, wherein said inline bedding conveyer further comprises a receiving end and a dispatch end, wherein said receiving end of said inline bedding conveyer is positioned a distance below said tunnel conveyer.

7. The apparatus for cleaning animal cage components of claim 6, wherein the vertical distance between said tunnel conveyer and said receiving end of said inline bedding conveyer is such that at least one of said cage components progressing from said tunnel conveyer to said inline bedding conveyer will become inverted.

8. The apparatus for cleaning animal cage components of claim 1, wherein said optical arranger robot system further comprises an optical eye, an encoding device, and an optical arranger robot.

9. The apparatus for cleaning animal cage components of claim 8, wherein said optical eye transmits a video signal presenting the position of said at least one of said cage components in a predetermined area to an encoding device, and said encoding device converts said video signals into a command signal suitable for directing said optical arranger robot to grasp said at least one of said cage components and place said at least one of said cage components on said re-grip station.

10. The apparatus for cleaning animal cage components of claim 1, wherein said base of said robotic arm assembly is propelled along said track of said stationary mounting section via a rack and pinion system.

11. An apparatus for cleaning animal cage components comprising:
    a soil side robot for removing soiled bedding from at least one of said cage components, and placing said at least one of said cage components upon a tunnel conveyer for advancing said at least one of said cage components through a tunnel washing system;
    an optical arranger robot system for detecting said at least one of said cage components exiting said tunnel washing system, and placing said at least one of said cage components upon a re-grip station;
    a clean side robot having a robotic arm assembly for removing said at least one of said cage components from said re-grip station, and placing said at least one of said cage components on a rack, pallet, or fixture; and said clean side robot has a robotic arm assembly having a base slidably mounted and attached to a substantially horizontal track on a stationary mounting section.

12. The apparatus for cleaning animal cage components of claim 1, wherein said tunnel washing system is a continuous driven conveying belt tunnel wash system.

13. The apparatus for cleaning animal cage components of claim 11, further comprising a clean bedding dispenser for adding bedding material to said at least one of said cage components that have passed through said tunnel washing system.

14. The apparatus for cleaning animal cage components of claim 11, further comprising an inline bedding conveyer wherein said inline bedding conveyer is located adjacent to said tunnel conveyer and said optical arranger robot system.

15. The apparatus for cleaning animal cage components of claim 14, wherein said inline bedding conveyer further comprises an inline tunnel type conveyorized bedding dispenser.

16. The apparatus for cleaning animal cage components of claim 14, wherein said inline bedding conveyer further comprises a receiving end and a dispatch end, wherein said receiving end of said inline bedding conveyer is positioned a distance below said tunnel conveyer.

17. The apparatus for cleaning animal cage components of claim 16, wherein the vertical distance between said tunnel conveyer and said receiving end of said inline bedding conveyer is such that at least one of said cage components progressing from said tunnel conveyer to said inline bedding conveyer will become inverted.

18. The apparatus for cleaning animal cage components of claim 11, wherein said optical arranger robot system further comprises an optical eye, an encoding device, and an optical arranger robot.

19. The apparatus for cleaning animal cage components of claim 18, wherein said optical eye transmits a video signal presenting the position of said at least one of said cage components in a predetermined area to an encoding device, and said encoding device converts said video signals into a command signal suitable for directing said optical arranger robot to grasp said at least one of said cage components and place said at least one of said cage components on said re-grip station.

20. The apparatus for cleaning animal cage components of claim 11, wherein said base of said robotic arm assembly is propelled along said track of said stationary mounting section via a rack and pinion system.

* * * * *